(12) United States Patent
Abedi et al.

(10) Patent No.: US 11,357,219 B2
(45) Date of Patent: Jun. 14, 2022

(54) TRAP FOR CAPTURING MARINE ANIMALS

(71) Applicants: Mehdi Abedi, Brighton, MA (US); Reza Mollaaghababa, Natick, MA (US)

(72) Inventors: Mehdi Abedi, Brighton, MA (US); Reza Mollaaghababa, Natick, MA (US)

(*) Notice: Subject to any disclaimer, the term of this patent is extended or adjusted under 35 U.S.C. 154(b) by 152 days.

(21) Appl. No.: 16/786,752

(22) Filed: Feb. 10, 2020

(65) Prior Publication Data
US 2020/0253177 A1  Aug. 13, 2020

Related U.S. Application Data

(60) Provisional application No. 62/803,843, filed on Feb. 11, 2019.

(51) Int. Cl.
*A01K 69/08* (2006.01)
*A01K 97/12* (2006.01)

(52) U.S. Cl.
CPC ............ *A01K 69/08* (2013.01); *A01K 97/125* (2013.01)

(58) Field of Classification Search
CPC ........ A01K 69/00; A01K 69/04; A01K 69/06; A01K 69/08; A01K 69/10; A01K 74/00; A01K 75/00; A01K 79/00; A01K 97/125
USPC ...................... 43/100, 102, 103, 105, 17, 9.3
See application file for complete search history.

(56) References Cited

U.S. PATENT DOCUMENTS

| | | | | | |
|---|---|---|---|---|---|
| 132,476 | A | * | 10/1872 | Livaudais | A01K 69/06 43/105 |
| 2,156,452 | A | * | 5/1939 | Guyman | A01K 73/10 43/9.3 |
| 3,040,980 | A | * | 6/1962 | Mann | G06M 7/04 377/6 |
| 3,055,139 | A | * | 9/1962 | Condello | A01K 69/06 43/61 |
| 3,299,559 | A | * | 1/1967 | Luketa | A01K 73/10 43/9.3 |
| 3,366,969 | A | * | 1/1968 | Luketa | A01K 73/10 43/9.3 |

(Continued)

FOREIGN PATENT DOCUMENTS

| | | | | |
|---|---|---|---|---|
| DE | 10126225 A1 | * | 12/2002 | ............. A01K 69/00 |
| DE | 10346789 B3 | * | 2/2005 | ............. A01K 69/06 |

(Continued)

*Primary Examiner* — Darren W Ark
(74) *Attorney, Agent, or Firm* — Barnes & Thornburg LLP

(57) ABSTRACT

In one aspect, a trap for capturing a marine animal, e.g., a lobster, is disclosed, which includes a housing having an inlet port for receiving a marine animal, said inlet port being configured to prevent the marine animal from leaving the container, and a sensor coupled to the housing for detecting the presence of the marine animal in the housing. In some embodiments, a stretchable netting is coupled to the inlet port such that the marine animal passes through the netting before entering the housing via the inlet port. A stretch detector can be coupled to the netting to register the passage of a marine animal via the netting into the housing. The passage of a marine animal through the netting can result in a stretch of the netting, which is registered by the stretch signal. The stretch signal indicates the passage of the marine animal into the housing.

10 Claims, 4 Drawing Sheets

(56) References Cited

U.S. PATENT DOCUMENTS

| | | | | | |
|---|---|---|---|---|---|
| 3,478,462 | A | * | 11/1969 | Pietrucha | A01K 73/10 43/9.3 |
| 3,508,358 | A | * | 4/1970 | Lee | A01K 69/06 43/60 |
| 4,046,996 | A | * | 9/1977 | Williams | A01K 97/05 377/6 |
| 4,141,172 | A | * | 2/1979 | Prosol | A01K 69/06 43/105 |
| 4,179,839 | A | * | 12/1979 | Salotti | A01M 1/02 377/1 |
| 4,275,523 | A | * | 6/1981 | Baima | A01M 1/02 43/112 |
| RE30,841 | E | | 1/1982 | Ramberg | A01K 73/10 73/862.391 |
| 4,373,288 | A | * | 2/1983 | McCrink | A01K 69/06 43/100 |
| 4,393,617 | A | * | 7/1983 | Charnoske | A01M 23/245 43/100 |
| 4,406,083 | A | * | 9/1983 | Hart | A01K 69/06 43/105 |
| 4,434,575 | A | * | 3/1984 | Pearson | A01K 69/06 43/100 |
| 4,437,255 | A | * | 3/1984 | Reed | A01K 93/02 340/668 |
| 4,569,146 | A | * | 2/1986 | Lowrance | A01K 97/02 43/17.1 |
| 4,743,742 | A | * | 5/1988 | Espedalen | G06M 7/00 235/1 R |
| 4,831,774 | A | * | 5/1989 | Gonzalez | A01K 69/06 43/100 |
| 4,980,989 | A | * | 1/1991 | Davis | A01K 69/06 43/100 |
| 5,133,149 | A | * | 7/1992 | Smyly, Sr. | A01K 69/06 43/100 |
| 5,156,291 | A | * | 10/1992 | Mielke | A01K 97/20 220/254.5 |
| 5,170,581 | A | * | 12/1992 | Lyons | A01K 91/08 43/17 |
| 5,483,767 | A | * | 1/1996 | Langer | A01K 79/02 43/4 |
| 5,511,335 | A | * | 4/1996 | Langer | A01K 79/02 43/17.1 |
| 5,546,695 | A | * | 8/1996 | Langer | A01K 79/02 43/44.98 |
| 5,555,666 | A | * | 9/1996 | Glatzer | A01K 69/06 43/100 |
| 5,782,033 | A | * | 7/1998 | Park | A01K 97/125 43/17 |
| 5,941,016 | A | * | 8/1999 | Welcher | A01K 97/20 43/55 |
| 6,247,264 | B1 | * | 6/2001 | Prosol | A01K 69/10 43/100 |
| 6,809,658 | B1 | * | 10/2004 | Lofaso | G08B 5/36 206/315.11 |
| 6,917,294 | B2 | * | 7/2005 | Larsen | A01K 75/00 340/573.2 |
| 7,111,427 | B1 | * | 9/2006 | Gaughen | A01K 69/06 43/100 |
| 7,866,541 | B2 | * | 1/2011 | Kerekes | A01K 97/20 235/1 B |
| 8,044,337 | B2 | * | 10/2011 | Duszynski | G06M 1/101 250/221 |
| 8,553,501 | B1 | * | 10/2013 | Cota | G01V 1/38 367/131 |
| 8,651,057 | B1 | * | 2/2014 | Welsh | A01K 61/90 119/200 |
| 8,919,034 | B2 | * | 12/2014 | Alhuwaishel | A01M 23/10 43/100 |
| 9,091,550 | B1 | * | 7/2015 | Smith | G06Q 50/02 |
| 9,210,917 | B1 | * | 12/2015 | Head | A01K 69/06 |
| 9,814,226 | B2 | * | 11/2017 | Opshaug | A01K 97/125 |
| 10,375,940 | B2 | * | 8/2019 | Al-Farhan | A01K 73/12 |
| 10,881,087 | B1 | * | 1/2021 | Poulsen | A01K 69/00 |
| 10,888,072 | B2 | * | 1/2021 | Bethea | A01K 63/02 |
| 11,122,785 | B2 | * | 9/2021 | Greenberg | A01K 69/08 |
| 11,147,251 | B1 | * | 10/2021 | Fu | A01K 69/08 |
| 2004/0174266 | A1 | * | 9/2004 | Larsen | A01K 75/00 340/573.2 |
| 2005/0097808 | A1 | * | 5/2005 | Vorhies | A01M 23/20 43/61 |
| 2005/0198892 | A1 | * | 9/2005 | Lin | A01K 69/06 43/100 |
| 2006/0150470 | A1 | * | 7/2006 | Ronnau | A01M 31/002 43/58 |
| 2008/0230542 | A1 | * | 9/2008 | Thielke | A01K 97/20 220/212 |
| 2008/0236023 | A1 | * | 10/2008 | Thomas | A01M 23/32 43/58 |
| 2008/0271362 | A1 | * | 11/2008 | Mikhail | A01K 69/06 43/100 |
| 2009/0133313 | A1 | * | 5/2009 | Skjold-Larsen | A01K 75/00 43/9.3 |
| 2013/0109259 | A1 | * | 5/2013 | Abulrassoul | B63C 7/26 441/11 |
| 2015/0156998 | A1 | * | 6/2015 | Terry | A01K 69/00 43/4.5 |
| 2016/0309692 | A1 | * | 10/2016 | Opshaug | A01K 69/08 |
| 2019/0061890 | A1 | * | 2/2019 | Fiorello | B63G 8/22 |
| 2020/0296925 | A1 | * | 9/2020 | Bennett | A01K 11/006 |
| 2021/0244005 | A1 | * | 8/2021 | Sinclair | A01K 61/60 |

FOREIGN PATENT DOCUMENTS

| | | | | |
|---|---|---|---|---|
| JP | 09215463 | A | * 8/1997 | |
| JP | 2002136245 | A | * 5/2002 | |
| JP | 2005312328 | A | * 11/2005 | |
| WO | WO-03003823 | A1 | * 1/2003 | A01K 61/60 |
| WO | WO-2017042786 | A1 | * 3/2017 | A01K 69/08 |
| WO | WO-2019240591 | A2 | * 12/2019 | A01K 75/00 |

* cited by examiner

TRAP FOR CAPTURING MARINE ANIMALS

CROSS-REFERENCE TO RELATED APPLICATIONS

This application claims the benefit of U.S. Provisional Application 62/803,843, filed Feb. 11, 2019. The entire contents of this application are incorporated by reference herein.

FIELD

This disclosure is generally directed to a trap for capturing a marine animal, and more particularly to such a trap that can include a sensor for monitoring the capture of the marine animal by the trap.

BACKGROUND

The seafood industry is a thriving industry in many countries. The capture of some marine animals, such as lobsters, involves laying traps in the off-shore waters. In such cases, the fishermen, e.g., lobster fishermen, need to make on-site periodic visits to a trap to determine if the trap has captured any animals, and if so, the number of animals (e.g., lobsters) captured by the trap. Such on-site visits can be time-consuming and can further add to the expense of operating the business. Further, inclement weather can inhibit making such on-site visits.

Accordingly, there is a need for more enhanced systems and methods for monitoring traps designed for capturing marine animals.

SUMMARY

In one aspect, a trap for capturing a marine animal, e.g., a lobster, is disclosed, which includes a housing having an inlet port for receiving a marine animal, said inlet port being configured to prevent the marine animal from leaving the housing, and a sensor coupled to the housing for detecting the presence of the marine animal in the housing.

In some embodiments, a stretchable netting is coupled to the inlet port such that the marine animal passes through the netting before entering the housing via the inlet port. A stretch detector can be coupled to the netting to register the passage of a marine animal via the netting into the housing. The passage of a marine animal through the netting can result in a stretch of the netting. In particular, as the marine animal passes through the section of the netting to which the stretch detector is coupled, it stretches the netting, which is registered by the stretch signal. The stretch signal indicates the passage of the marine animal into the housing.

In some embodiments, a controller is coupled to the housing and is in communication with the stretch sensor (e.g., via a wireless protocol) to control the sensor and receive stretch signals generated by the sensor. The controller can also be in communication with a user device, e.g., an application executing on a mobile device of a user, to transmit the stretch signal(s) to the application. The application can operate on the stretch signals, e.g., by adding the stretch signals, to indicate whether at any given time, a marine animal (e.g., a lobster) is present in the trap, and if so, to indicate the number of captured animals. Further in some embodiments, the application can present temporal data indicative of the number of marine animals captured as a function of time to the user.

In some embodiments, the housing is configured for placement at a depth of water, e.g., at a depth in a range of about 20 m to about 40 m. The housing can be formed of any suitable material, such as a metal (e.g., aluminum) or wood. In some embodiments, the housing is in the form of a mesh that allows visual inspection of the content of the housing. Alternatively, the housing can be formed of a transparent plastic, which would also allow the visual inspection of the content of the housing. Yet, in other embodiments, the housing can be partially or completely non-transparent.

In some embodiments, an antenna is coupled to the housing for facilitating the transmission of stretch signals generated by the stretch sensor to a user device. The transmission of the signals can be achieved using any known and suitable communication protocol.

Further understanding of the invention can be achieved by reference to the following detailed description in conjunction with the associated drawings, which are described briefly below.

DETAILED DESCRIPTION

The present disclosure is generally directed to a trap for capturing marine animals, such as lobsters. In some embodiments, a trap according to the present teachings can include an opening through which a marine animal can enter the trap. A stretchable netting can be coupled to the opening such that a marine animal has to traverse through a passage provided by the netting in order to enter the trap. A stretch sensor can be coupled to a portion of the netting to generate stretch signal(s) in response to the passage of a marine animal through the netting. Such stretch signal(s) can be analyzed to determine whether the trap contains one or more marine animals of interest, and if so, the number of such animals captured by the trap.

Figure 1:
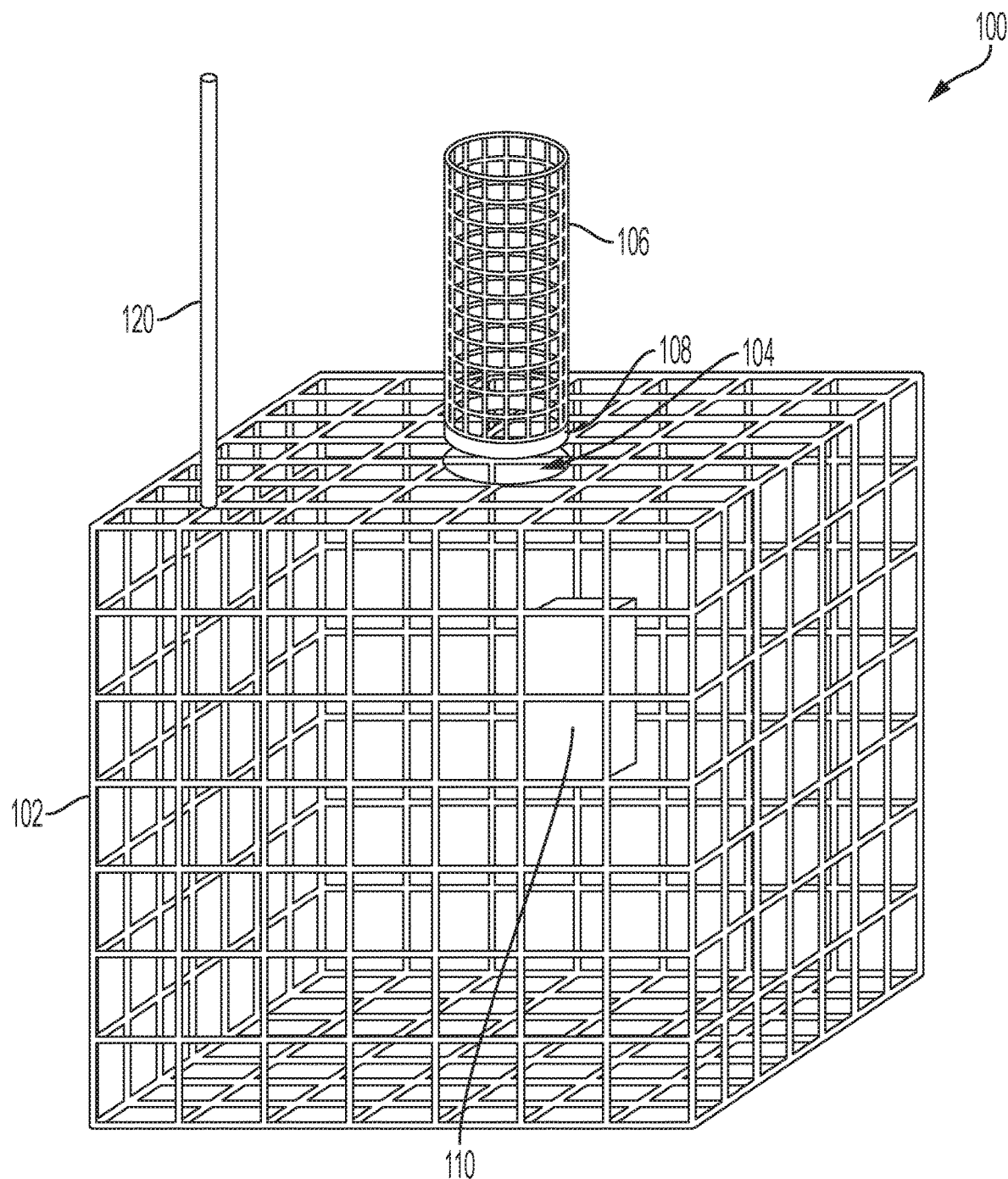
FIG. 1 schematically depicts a marine trap according to an embodiment of the invention, which includes a stretchable netting to which a stretch detector is coupled for monitoring the passage of a marine animal into the housing, FIG. 2 schematically depicts an example of an implementation of a controller employed in the trap depicted in FIG. 1 for communicating with the stretch sensor, FIG. 3 schematically depicts an example of a user device on which an application according to an embodiment is executed for receiving the stretch signals and presenting the data to a user, and FIG. 4 schematically depicts a graphical element presented by the application shown in FIG. 3 to a user by which the stretch data is presented to the user.

FIG. 1 schematically depicts a marine trap 100 according to an embodiment of the present teachings, which includes a housing 102 having an opening 104 through which a marine animal can enter the housing. The sizes of the housing 102 and the opening 104 can be selected to accommodate one or more marine animals of interest. By way of example, when the trap 100 is employed to capture lobsters, the housing and its opening can be configured to allow entry of one lobster at a time through the opening into the housing. By way of example, in some such embodiments, the opening 104 can be substantially circular with a diameter in a range of about 2 inches to about 10 inches, though other sizes can also be employed. In other embodiments, the opening 104 can have other cross-sectional profiles and/or sizes.

In this embodiment, the housing has a substantially cubic shape with a volume, e.g., in a range of about 0.5 m3 to about 1 m3, though other volumes and shapes can also be employed. In other embodiments, the housing can have other shapes and/or sizes. The housing can also be made from a variety of different materials. For example, in this embodiment, the housing is formed using a metal mesh, e.g., an aluminum mesh, though other materials, such as wood, can also be employed.

With continued reference to FIG. 1, in this embodiment, a stretchable netting 106 is coupled to the opening through which a lobster can enter the housing. A stretch sensor 108 is coupled to the netting, e.g., at the entrance or exit opening of the netting or somewhere in between the entrance and the exit openings. In this embodiment, the stretch sensor 108 is in the form of a circular band that encircles a portion of the netting. As a lobster traverses the length of a passage provided by the netting, the pressure of the lobster on the netting causes the netting to stretch. In particular, as the lobster passes through a section of the netting that is coupled to the stretch sensor 108, that section of the netting is stretched, thereby causing the sensor 108 to register a signal indicative of the passage of a lobster through the netting and into the housing.

A variety of stretch sensors (herein also referred to as stretch detectors) that are commercially available can be used in the practice of the invention. An example of such a stretch sensor includes a conductive rubber stretch sensor, e.g., one available from Adafruit Industries of New York, U.S.A.

In this embodiment, a controller 110 for controlling the stretch sensor and transmitting the data generated by the stretch sensor to a user device can be coupled to the housing. In some embodiments, the controller 110 can communicate with the stretch sensor 108 via a wireless protocol, e.g., Bluetooth. In other embodiments, the controller 110 can be coupled via electrical conductors to the stretch sensor to receive stretch signals therefrom.

The controller 110 can further include a communication module for transmitting the stretch signals to an application executing on a user device, e.g., a device employed by a user on shore or on a boat. In this embodiment, an antenna 120 is coupled to the housing, which can transmit signals indicative of the data generated by the stretch detector to the user device.

Figure 2:
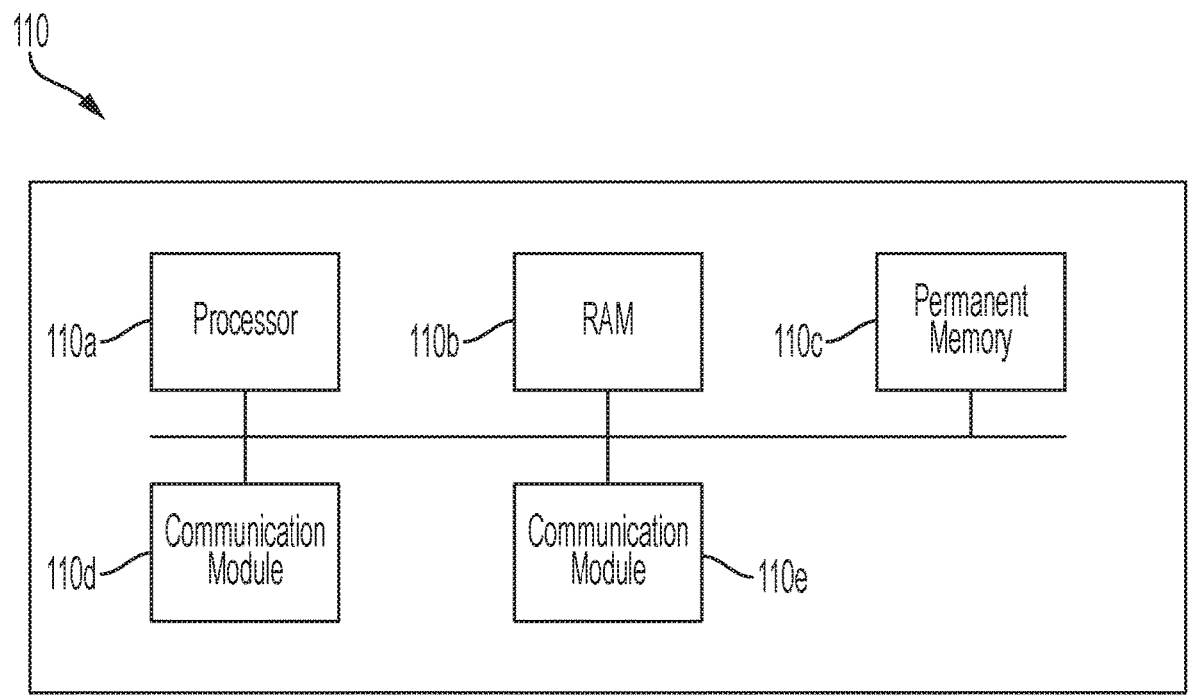

The controller 110 can be implemented in hardware, firmware and/or software using known techniques informed by the present teachings. By way of example, FIG. 2 schematically depicts an example of an implementation of the controller 110, which includes a processor 110a, a random access memory (RAM) 110b, a permanent memory 110c, a first communication module 110d, and a second communication module 110e. The communication module 110d allows the controller 110 to communicate with the stretch sensor 108 to control the sensor and/or receive stretch data generated by the sensor. The communication module 110e in turn allows the controller 110 to communicate with an application executing on a user's device, e.g., to transmit the stretch data generated by the stretch sensor to that application.

Although in this embodiment, the communication modules 110d and 110e are depicted as two separate modules, in other embodiments, the functionalities of these modules can be incorporated into a single module.

Further, in some embodiments, the controller can include software for determining the location of the trap, e.g., via global position system (GPS).

Figure 3:
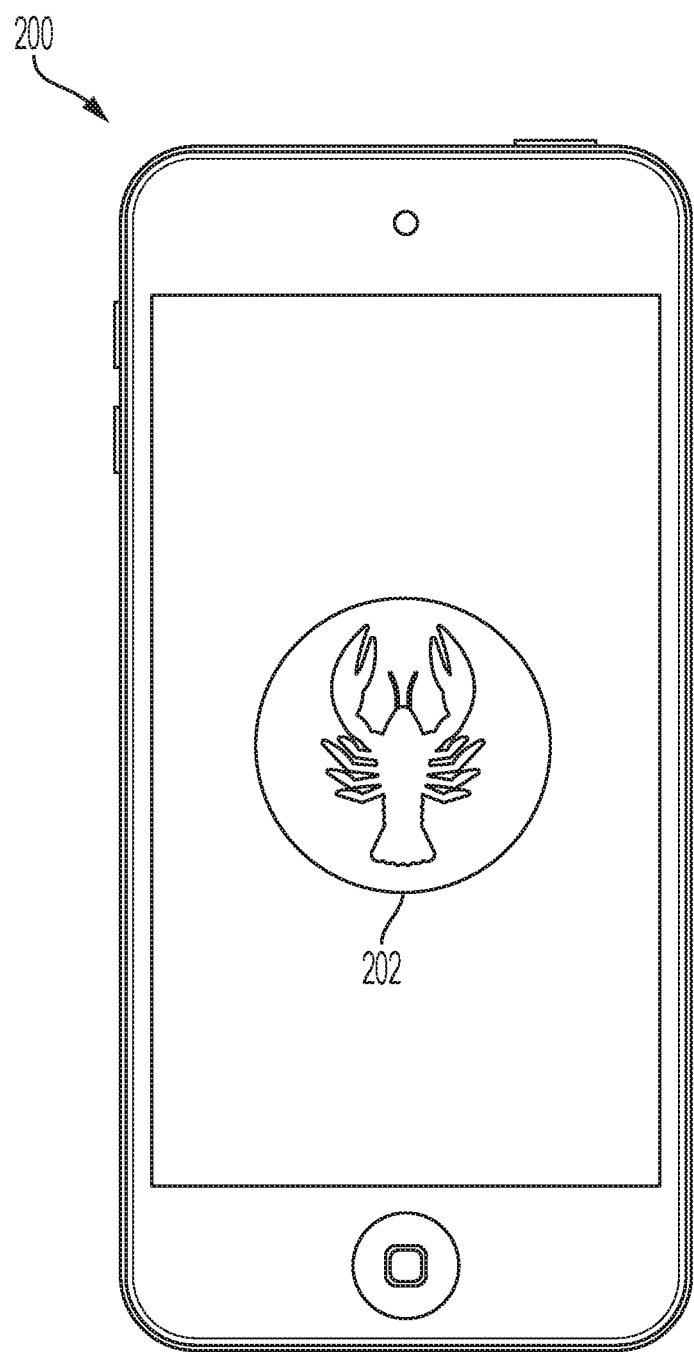
Figure 4:
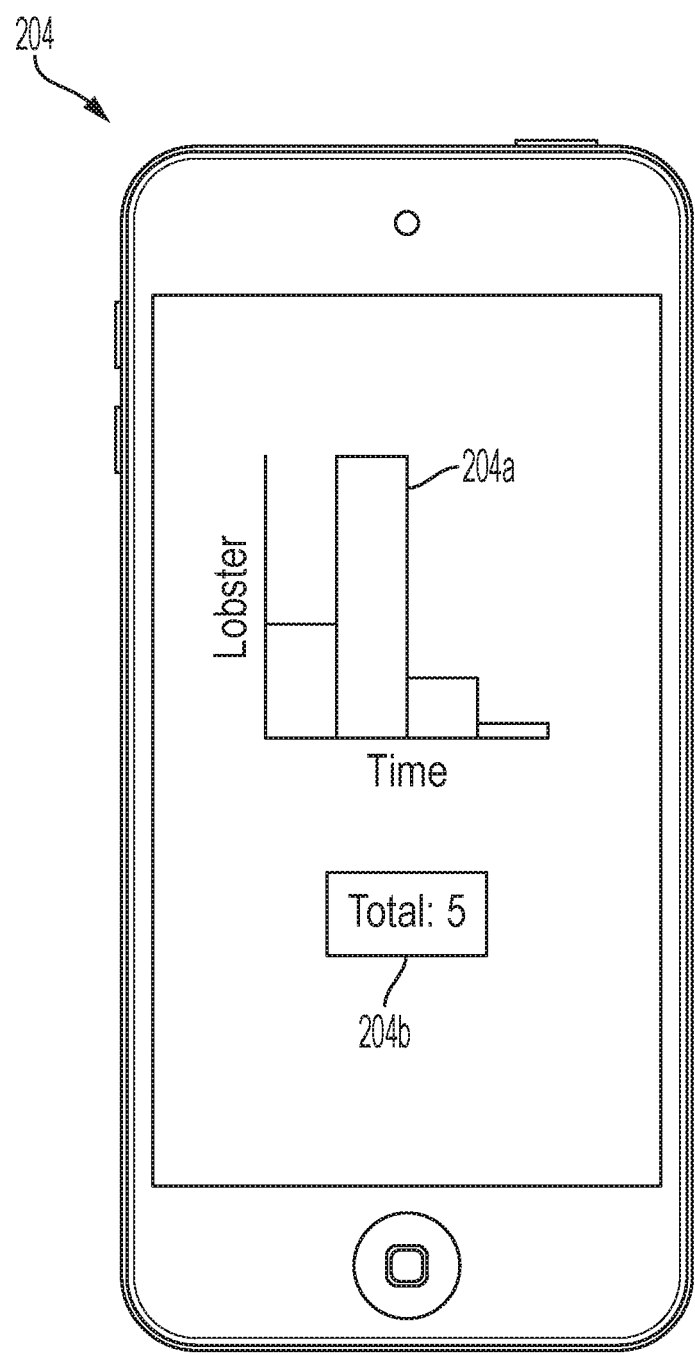

In some embodiments, the user device is a mobile device, such as a mobile phone, tablet, etc., on which an application according to the present teachings is executed. By way of example, FIG. 3 schematically depicts a user device 200, e.g., a mobile phone or a tablet, on which an application 202 (herein referred to as "Lobster Find"), which is configured to execute on the user device 200. As shown in FIG. 4, in some embodiments, the application 202 can present a graphical user interface 204 that presents the data received from the controller to a user.

By way of example, in this embodiment, the user graphical interface 204 can present a graph 204a, which shows the detection of a signal indicative of the passage of a lobster through the netting as a function of time to a user. Further, a graphical element 204b can present the user with the cumulative number of lobsters present in the housing at a given time. The application 202 can present other graphical elements, e.g., a log-in page, to the user that can facilitate the interaction of the user with the application 202.

In other embodiments, in addition to the stretch sensor 108, one or more cameras can also be coupled to the housing, which can transmit still pictures or video of the content of the housing to a user device, e.g., a mobile device.

A marine animal trap according to the present teachings can provide a number of advantages. For example, it can allow monitoring the content of the trap remotely without the need for on-site visual inspection. This can be particularly helpful for lobster fishermen who have to make periodic on-site visits to lobster traps to determine whether the trap has captured any lobsters, and if so, to find out the number of lobsters captured.

Those skilled in the art will appreciate that various changes can be made to the above embodiments without departing from the scope of the invention.

What is claimed is:

1. A trap for capturing a marine animal, comprising:
   a housing having an opening through which a marine animal can enter the housing,
   a stretchable netting coupled to the opening, said stretchable netting extending from an inlet port through which the marine animal can enter the netting to an exit port through which the animal can exit the netting to enter the housing, and
   a stretch sensor for registering passage of the marine animal through the netting via detection of a stretch in the netting caused by the passage of the marine animal to thereby generate a stretch signal,
   wherein the stretch sensor comprises a circular band that encircles a portion of the stretchable netting.

2. The trap of claim 1, further comprising a controller in communication with the stretch sensor for any of controlling the sensor and receiving stretch data from the sensor.

3. The trap of claim 2, further comprising an application executing on a user device and configured for receiving said stretch signal.

4. The trap of claim 3, wherein said application is configured to present said stretch data to the user.

5. The trap of claim 4, wherein said application is configured to operate on said stretch data to generate a cumulative number of the marine animals captured by the trap.

6. The trap of claim 1, further comprising an antenna coupled to the housing for transmitting the stretch signal to a user device.

7. The trap of claim 1, wherein the stretch sensor encircles the exit port of the stretchable netting.

8. The trap of claim 1, wherein the stretchable netting coupled to the opening extends outward from the housing.

9. The trap of claim 1, wherein the stretchable netting coupled to the housing is in the form of a cylinder.

10. The trap of claim 1, wherein the stretch sensor includes a conductive rubber.

* * * * *